US006982683B2

(12) United States Patent
Stanton

(10) Patent No.: US 6,982,683 B2
(45) Date of Patent: Jan. 3, 2006

(54) HEAD-MOUNTED PROJECTION DISPLAY SYSTEM

(75) Inventor: Douglas A. Stanton, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/390,798

(22) Filed: Mar. 18, 2003

(65) Prior Publication Data

US 2003/0179157 A1 Sep. 25, 2003

Related U.S. Application Data

(63) Continuation of application No. 09/206,436, filed on Dec. 7, 1998, now Pat. No. 6,535,182.

(51) Int. Cl.
*G09G 5/00* (2006.01)

(52) U.S. Cl. .............................................. 345/7; 345/8

(58) Field of Classification Search .................... 345/8, 345/7, 9; 359/630, 631, 633; 348/115, 42, 348/51, 52, 118
See application file for complete search history.

(56) References Cited

U.S. PATENT DOCUMENTS

| | | | |
|---|---|---|---|
| 3,830,682 A * | 8/1974 | Rowland | 428/142 |
| 3,915,548 A * | 10/1975 | Opittek et al. | 345/7 |
| 4,340,878 A * | 7/1982 | Spooner et al. | 340/980 |
| 4,761,056 A * | 8/1988 | Evans et al. | 359/631 |
| 5,052,932 A * | 10/1991 | Trani | 434/29 |
| 5,130,794 A * | 7/1992 | Ritchey | 348/39 |
| 5,189,452 A * | 2/1993 | Hodson et al. | 353/94 |
| 5,483,307 A * | 1/1996 | Anderson | 353/98 |
| 5,606,458 A * | 2/1997 | Fergason | 359/630 |
| 5,671,037 A * | 9/1997 | Ogasawara et al. | 351/158 |
| 5,677,795 A * | 10/1997 | Hegg | 359/630 |
| 6,023,253 A * | 2/2000 | Taniguchi et al. | 345/7 |
| 6,535,182 B2 * | 3/2003 | Stanton | 345/8 |

* cited by examiner

*Primary Examiner*—Guy Lamarre
*Assistant Examiner*—Fritz Alphonse

(57) ABSTRACT

A head-mounted projection display system is characterized by a pair of head-mounted low-power image projectors mounted adjacent the eyes of the viewer, and aimed to project in a direction along the line of sight of the viewer toward a high-gain, retro-reflective screen. Stereoscopic viewing is enabled by projecting separate images to the right and left projectors. The retro-reflectivity of the screen ensures that the right and left images will be returned to the right and left eye, respectively.

18 Claims, 2 Drawing Sheets

HEAD-MOUNTED PROJECTION DISPLAY SYSTEM

CROSS REFERENCE TO RELATED APPLICATIONS

This is a continuation of application Ser. No. 09/206,436, filed Dec. 7, 1998 now U.S. Pat. No. 6,535,182.

BACKGROUND OF THE INVENTION

This invention relates to a head-mounted projection display system, and more particularly relates to such a display system in which the display is stereoscopic.

A variety of head-mounted displays are in use or have been proposed. Usually they involve a CRT or a spatial light modulator coupled to a source of light to create the display image. In the simplest versions, the images are viewed directly by the eye, assisted by suitable optics. See, for example, Japanese Kokai 4-34588 (A). Some versions permit the ambient environment to be viewed through the apparatus while information is added to the observer's view from the display. See, for example, U.S. Pat. No. 5,677,795.

In UK patent application GB 2 043 940 A, a ground-based craft-flight simulator is described, in which separate right and left light beams from a laser-scanning image generator are fed to right and left projection lenses mounted on a helmet above the eyes of a wearer-trainee, and projected onto a retro-reflective viewing screen. A diffraction grating on the front of the screen adjusts the angle of the retro-reflected image, so that the projected beams are reflected onto a plane mirror mounted on the helmet between the projection lenses and the eyes of the viewer. Motors mounted on the helment rotate the mirror, to achieve scanning of the reflected light beams onto the screen to build up the display image.

As will be appreciated, this system is complex and would be expensive to implement, limiting its applicability to specialized uses such as military or commercial pilot training.

A simple low-power, head-mounted projection display system, particularly one which provides stereoscopic viewing, would be useful in a variety of applications, notably virtual reality systems, useful, for example, in education, training, and/or entertainment.

OBJECTS AND SUMMARY OF THE INVENTION

Accordingly, it is an object of the invention to provide a simple, low-power, head-mounted projection display system.

It is another object of the invention to provide such a head-mounted projection display system in which stereoscopic viewing is possible.

In accordance with one aspect of the invention, there is provided a head-mounted projection display system comprising head gear including at least one low-power projector positioned such that the images from the projector are directed away from the viewer's eyes. More specifically, the projector is mounted so as to project an image in a direction along the viewer's line-of-sight. Preferably, a pair of projectors are mounted on opposite sides of the head gear, adjacent the viewer's eyes, and each projector is aimed to project an image in a direction along the viewer's line-of-sight.

The projected image is directed to a high-gain, retro-reflective viewing screen, which returns light from the low power projector(s) at sufficient brightness for the viewer to see the projected image(s). Due to the small angle of return (on the order of about 1–2 degrees), each eye sees only the image from its adjacent projector, enabling stereoscopic viewing in the event that separate images are projected by each projector, without the attenuation, temporal or optical manipulation common to known stereoscopic display systems.

The retro-reflective viewing screen is capable of having a wide viewing angle. This characteristic, together with the retro-reflectivity of the screen, permits a single viewer or multiple viewers, each with their own headgear, to see the same image or different images at large angles of view without significant degradation, making possible, for example, one or more viewers moving within the viewing space, or an audience of stationary viewers.

DESCRIPTION OF THE PREFERRED EMBODIMENTS

Figure 1:
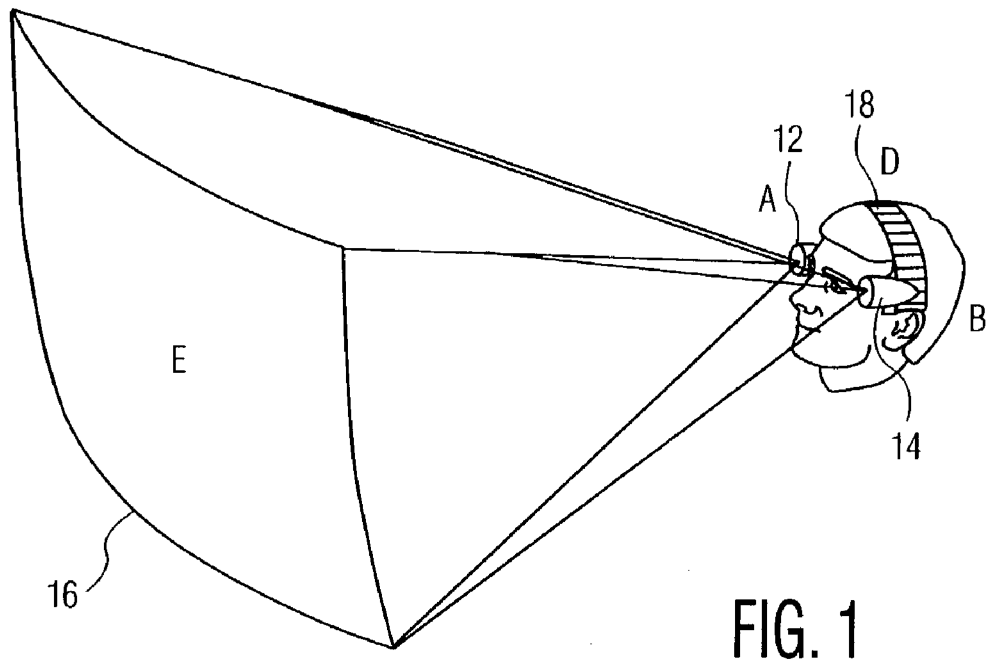
FIG. 1 is a perspective view of one embodiment of the projection system of the invention, including a pair of low power projectors mounted on headgear, and a high-gain, retro-reflective screen.

In FIG. 1, two low power projectors 12 and 14 are mounted on the viewer's head close to each eye. Each projector is aimed at the viewing screen 16 along the direction of the line of sight of the adjacent eye of the viewer. The projectors 12 and 14 are stabilized and referenced to the viewer's head by means of a headband 18. Possible alternative headgear include a hat or helmet.

Figure 2:
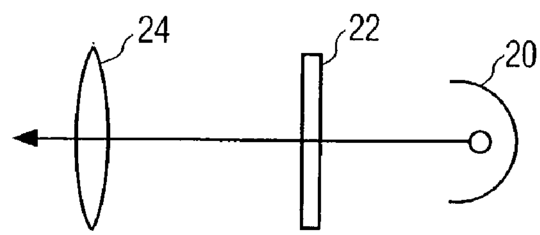
FIG. 2 is a schematic cross-section view of one of the low power projectors of FIG. 1.

The projectors each include a light source 20, an electro-optical light modulator 22, such as an LCD, and a projection lens 24, in the arrangement shown schematically in FIG. 2. Light may alternatively be supplied from a remote light source, eg., via optical fibers. Display information, such as video or computer generated display signals, are supplied to the modulator 22 via electrical cables, not shown.

The viewing screen 16 is retro-reflective. That is, it returns all incident light back to the source within a narrow angle (about 1–2 degrees). Consequently, regardless of changes in the angle of incidence of the projected image caused by movement of the viewer's head, the screen will return the projected image to the viewer. The viewing screen also advantageously can have a very high gain, as high as 1600, for example, enabling the viewer to see the projected image at adequate brightness, despite the low power of the projectors. This low power not only reduces the cost of the system relative to more complex high power systems, but also enables the use of battery powered operation, introducing portability and the possibility of inputting display information, such as computer generated information, by wireless link.

Figure 4:
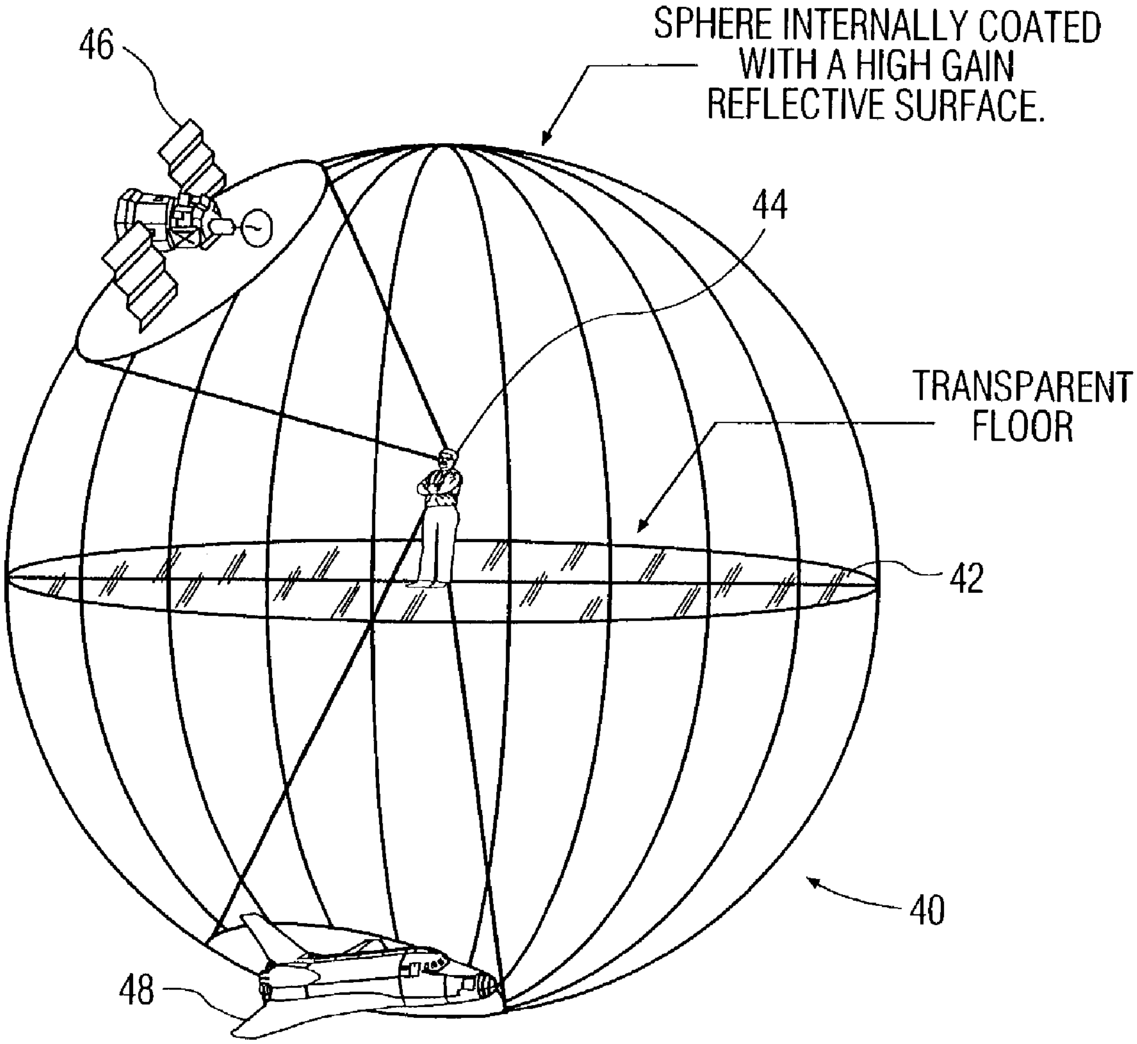
FIG. 4 is a schematic representation of a spherical viewing room with transparent floor in accordance the invention.

Depending upon the application, the screen could cover a portion of a wall or an entire wall or room. The walls of the room could be curved, eg., cylindrical or spherical. For example, FIG. 4 shows a spherical room 40 enclosing a transparent floor 42 and viewer 44. In the stereoscopic mode of the invention, such a room 40 could be used to project images 46 and 48 above and below viewer 44, for example, to train astronauts, since it would create a perception of floating in space.

Figure 3:
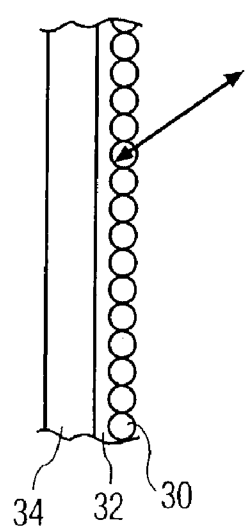
FIG. 3 is a detailed cross-section view of a portion of the screen of FIG. 1.

In one embodiment, shown in FIG. 3, the screen is composed of a surface of an array of uniformly sized microspheres 30, adhered to a substrate 34 by a reflective paint 32. The microspheres can be of any size above the wavelength of the light, and can also be of varying sizes. One way of constructing a large screen surface would be to blow the microspheres onto a substrate having a previously applied tacky base, eg., wet reflective paint. As is known, one alternative to reflective microspheres is the so-called corner cube. Retro-reflective screens are also commercially available. Two examples are the 3M Special Effects Projection screens #7610 and #7615.

The invention has been described in terms of a limited number of embodiments. Other embodiments, variations of embodiments and art-recognized equivalents will become apparent to those skilled in the art, and are intended to be encompassed within the scope of the invention, as set forth in the appended claims.

What I claim as my invention is:

1. A binocular projection display system, comprising:

a retroreflective projection display screen;

a headset configured to fit on a viewer's head, the headset being independently moveable from the screen, a first projector including an electro-optical light modulator disposed on the headset and a projection lens disposed to project a first component of a stereoscopic image in the line-of-sight of the viewer from a first location adjacent to a first one of viewer's eyes when the headset is worn; and a second projector disposed to project a second component of the stereoscopic image in the line-of-sight of the viewer from a second location adjacent to a second one of the viewer's eyes when the headset is worn.

2. The system of claim 1, the retroreflective projection display screen including an array of reflective microspheres on a substrate.

3. The system of claim 1, the retroreflective projection display screen including an array of reflective microspheres on a curved substrate.

4. The system of claim 3, in which the substrate has a spherical curvature.

5. The system of claim 1, the retroreflective projection display screen including an array of reflective microspheres on a wall of a room.

6. The system of claim 5, further including a transparent platform in the room on which the viewer can stand.

7. The system of claim 1, the electra-optical light modulator including an LCD.

8. The system of claim 1, wherein the display screen is a sphere surrounding the viewer and headset.

9. The system of claim 8, further including a transparent platform in the room on which the viewer can stand.

10. A binocular projection display system, comprising:

a retroreflective projection display screen;

a headset configured to fit on a viewer's head, the headset being independently moveable from the display screen, a first projector disposed on the headset and adapted to project a first component of a stereoscopic image in the line-of-sight of the viewer from a first location adjacent to a first one of viewer's eyes when the headset is worn; and a second projector disposed on the headset and adapted to project a second component of the stereoscopic image in the line-of-sight of the viewer from a second location adjacent to a second one of the viewer's eyes when the headset is worn, wherein the first projector comprises a light source, a projection lens, and an electra-optical light modulator adapted to receive and modulate light from the light source and to pass the modulated light therethrough to the lens for projection as the first component of the stereoscopic image.

11. The system of claim 10, the retroreflective projection display screen including an array of reflective microspheres on a substrate.

12. The system of claim 10, the retroreflective projection display screen including an array of reflective microspheres on a curved substrate.

13. The system of claim 12, in which the substrate has a spherical curvature.

14. The system of claim 10, the retroreflective projection display screen including an array of reflective microspheres on a wall of a room.

15. The system of claim 14, further including a transparent platform in the room on which the viewer can stand.

16. The system of claim 10, the electra-optical light modulator including an LCD.

17. The system of claim 10, wherein the display screen is a sphere surrounding the viewer and headset.

18. The system of claim 17, further including a transparent platform in the room on which the viewer can stand.

* * * * *